Aug. 30, 1955  R. F. BECKER  2,716,701
SEPARABLE SUSPENSION DEVICE FOR AN EXTENSION LAMP
Filed Dec. 6, 1949  2 Sheets-Sheet 2
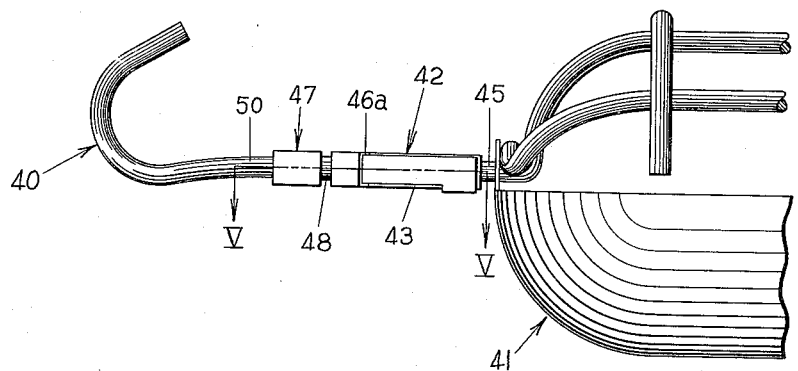
fig. 4
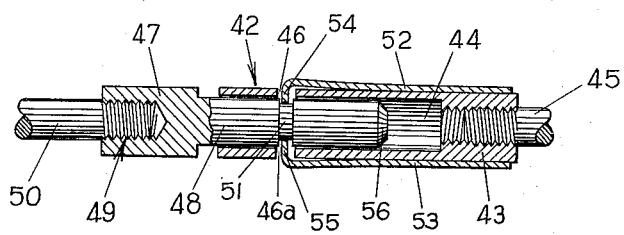
fig. 5
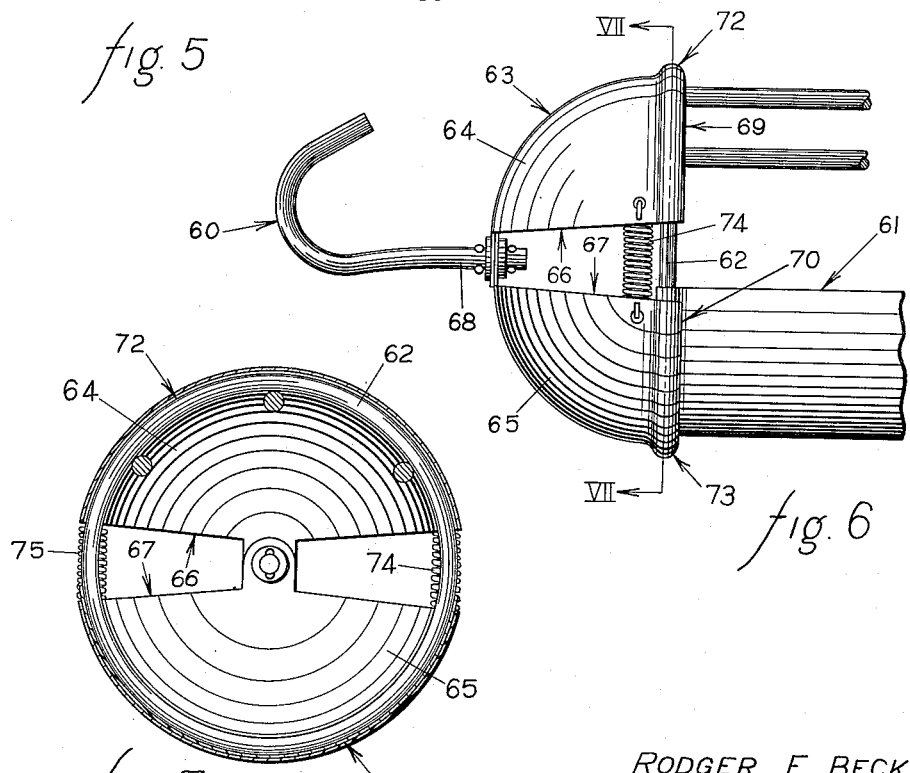
fig. 6
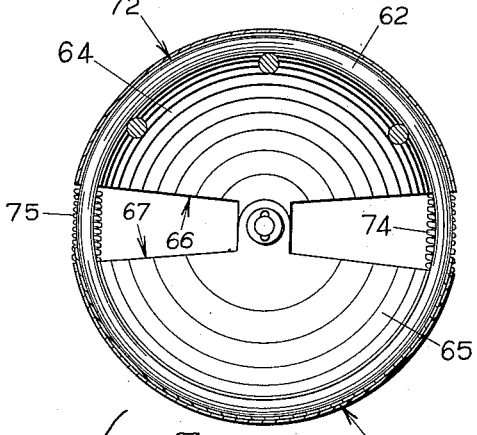
fig. 7
Inventor
RODGER F. BECKER
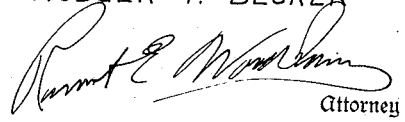
Attorney United States Patent Office 2,716,701
Patented Aug. 30, 1955

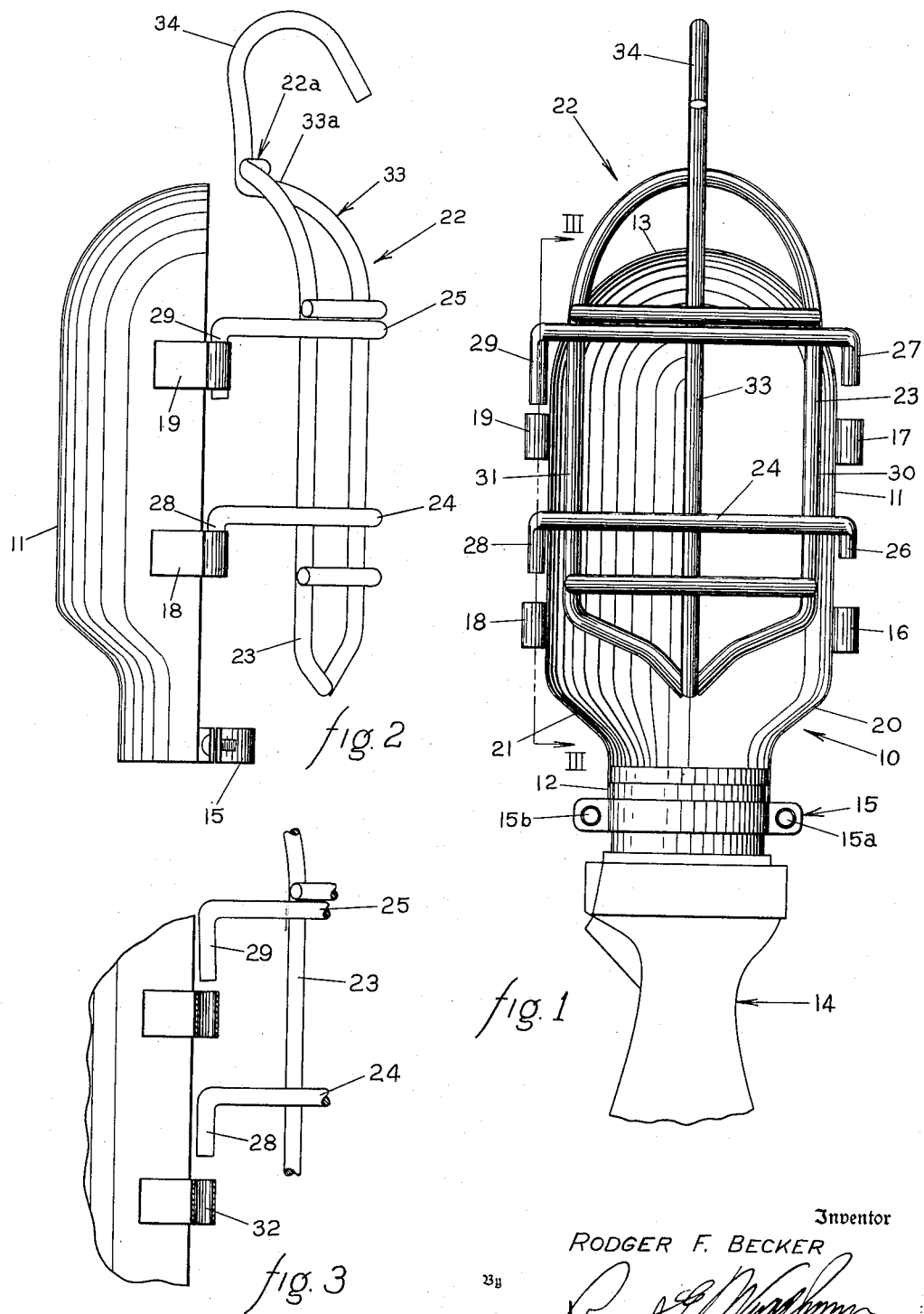

2,716,701

SEPARABLE SUSPENSION DEVICE FOR AN EXTENSION LAMP

Rodger F. Becker, Kalamazoo, Mich.

Application December 6, 1949, Serial No. 131,398

3 Claims. (Cl. 240—54)

This invention relates in general to an extension lamp having suspension means, such as a hook, separably secured thereto, and more particularly to a device for effecting such separation without damaging the parts thereof, when forces urging said lamp and hook apart are imposed thereon.

Extension lamps commonly used in mechanical work and related fields are generally provided with a suspension device, such as a hook, whereby the workman can suspend the lamp on any convenient support and thereby have both hands free.

However, certain hazards are associated with such devices. An example that occurs in the automotive repair field arises when a forgetful mechanic moves a car with an extension lamp still hooked onto the bumper. The extension cord often breaks and leaves a live wire free to cause injury. Or, in any event, even if no injury is caused by the live wire, it may require extensive repairs. Similar damage may arise when a workman trips over the extension cord or a passing object catches the extension cord.

Until the time of this invention, no device has to my knowledge been devised which would serve the functions of a suspendible extension lamp yet would eliminate this hazardous feature accompanying the use of such a lamp.

This invention contemplates an extension lamp having a suspension device, such as a hook, detachably secured thereto. The suspension device is so attached to the lamp that under ordinary handling it is held securely in place, but when a sudden force is applied to the extension cord, the suspension device will be automatically detached from the remainder of the lamp. Thus, when my lamp is hung upon a movable object, such as an auto bumper, there is no danger that the extension cord will be broken, for any sudden jerk or pull upon the cord will effect a disengagement between the suspension device and the rest of the lamp. The resulting fall may break the lamp bulb, but the lamp itself will not be damaged by the separation.

Accordingly, a primary object of this invention is the provision of an extension lamp, having a detachable means from which the lamp may be suspended, which will prevent breaking of the extension cord when any sudden force is applied to the suspension means while the lamp is in use.

A further object of this invention, is the provision of a suspendible extension lamp having a detachable suspension device which will not be disengaged from the lamp during ordinary handling.

Another object of the invention is the provision of means for detachably securing a suspension device to an extension lamp, whereby said suspension device can be easily and quickly re-attached to said lamp after a separation has occurred.

Another object of the invention is the provision of means for detachably securing a suspension device to an extension lamp, as aforesaid, which will separate by application of forces which do not exceed the tensile limits of the extension cord.

A further object of certain forms of the invention is to provide a device as above stated wherein the bulb is readily replaceable.

Other objects and purposes of this invention will become apparent to persons familiar with this type of equipment upon referring to the accompanying drawings and upon reading the following specification.

For illustration of my invention, reference is made to the accompanying drawings in which:

Figure 1 is a front elevation view of one embodiment of my invention with the guard, to which the suspension device is secured, detached from the remainder of the lamp.

Figure 2 is a side elevation view of the embodiment shown in Figure 1.

Figure 3 is a sectional view taken on the line III—III of Figure 1.

Figure 4 is a fragmentary, side elevation view of one modification of my invention.

Figure 5 is a sectional view taken along the line V—V of Figure 4.

Figure 6 is a fragmentary, side elevation view of another modification of my invention.

Figure 7 is a sectional view taken along the line VII—VII of Figure 6.

Construction

For convenience and without intending any limitation the end of the lamp, or parts associated therewith, appearing toward the top of the sheet in Figure 1 may hereinafter be termed "upper end" and the other end of the lamp, or parts associated therewith, may hereinafter be termed "lower end."

The extension lamp 10, Figures 1, 2 and 3, consists of a semi-cylindrical, reflective shell 11, having a reduced circumference at its lower open end 12 and having a gradually reducing circumference at its upper closed end 13.

The lower end 12 of the shell 11 is secured to a handle 14, of a conventional type, having a switch, a plug socket, and light socket therein, by any conventional means, such as the semi-circular gripping bracket 15, which is secured to said shell by the screws 15a and 15b.

Two hollow, preferably cylindrical, co-axial support brackets 16 and 17 are secured to the outer edge 20 of the shell 11. A similar pair of brackets 18 and 19 are similarly secured to the outer edge 21 of the shell 11.

A semi-cylindical, wire mesh guard 22, Figures 1 and 2, consisting of a substantially rectangular wire support base 23 with at least two parallel, spaced, semi-circular, transverse wires 24 and 25 secured to said base, as by welding, is detachably secured to the shell 11 by means of connector pins 26, 27, 28 and 29 which respectively engage the support brackets 16, 17, 18, and 19.

The pins 26 and 28, Figure 1, are formed by bending the ends of transverse wire 24 toward the lower end of the lamp so that said pins 26 and 28 are perpendicular to the plane of the wire 24, are parallel to each other and have their axes spaced apart a distance equal to the spacing of the axes of the hollow brackets 16 and 18. The pins 27 and 29, Figures 1 and 2, are similarly formed on the ends of the wire 25 and are spaced for engagement with the brackets 17 and 19.

However, the pin 29 is bent through slightly more than 90 degrees so that it forms a slightly acute angle with the plane defined by the wire 25 and, therefore, is not quite parallel with the pin 27. The purpose of this arrangement is explained hereinafter.

The connector pins 26, 27, 28 and 29 are of a diameter slightly less than the inside diameter 32, Figure 3, of the support brackets 16, 17, 18 and 19 so as to facilitate entry of the pins into the brackets. The pins are also of different lengths with respect to each other ranging, respectively, from the shortest pin 26 to the longest pin 29 so as to permit successive insertion of each pin into its respective support bracket.

A longitudinal wire 33 is secured to the wires 24 and 25, as by welding, substantially at equal distances from the sides 30 and 31 of the wire support base 23 and curves at 33a to engage and extend beyond the upper end 22a of said wire support base 23. The extended end of the wire 33 may be formed into a suitable suspension device such as the hook 34.

Alternative structures

As shown in Figures 4 and 5, the detachability of the suspension device, here the hook 40, from the lamp 41 may also be accomplished by providing a separable link 42 between said hook and said lamp.

The link 42 is comprised of an elongated support bar 43 having a longitudinal opening 44 therethrough. A rod 45, secured to, and extending from, the upper end of the lamp 41, is secured, as by threads, within one end of the opening 44. The bar 43 is provided with a pair of diametrically opposed slots 46 and 46a through the sidewalls thereof and communicating with the opening 44 near the other end thereof.

A swivel connector post 47, having a swivel pin 48 extending therefrom, is provided with a threaded opening 49 for securement of the shank 50 of the hook 40 therewithin. The swivel pin 48 which is slidably, and preferably rotatably, receivable into the opening 44, is provided with an annular groove 51 which is alignable with the slots 46 and 46a.

A pair of resilient fingers 52 and 53 are mounted upon the bar 43 so that the bent, normally parallel end portions 54 and 55, thereof, extend through the slots 46 and 46a for engagement with the walls of the groove 51. The free end 56 of the pin 48 is tapered to facilitate insertion thereof into the opening 49 past the finger ends 54 and 55.

That portion of the opening 44 in the bar 43 engaging the rod 45, and the opening 49 in the swivel post 47 engaging the shank 50 may be provided with self-tapping threads, whereby securement of the link 42 between the shank 50 and the rod 45 is facilitated.

The modification shown in Figures 6 and 7 discloses another connector 63 by means of which a suspension device, such as the hook 60, may be detachably secured to a lamp 61. A circular support ring 62 is secured to the upper end of the lamp 61 so that it lies in a plane perpendicular to the longitudinal axis of the lamp. The connector device 63 is comprised of a pair of spherical shell elements 64 and 65 pivotally supported along one edge 66 and 67, respectively, of each upon the shank 68 of the hook 60. Each shell has a semi-circular edge 69 and 70, respectively, which edges lie substantially within a single plane spaced from the hook 60.

The shells 64 and 65 are provided with opposed grooves 72 and 73 adjacent to and parallel with the circular edges 69 and 70. Said grooves are shaped for snug embracing of the ring 62. Resilient means such as the springs 74 and 75 connect said shell edges 66 and 67 on opposite sides of the hook shank 68 for yieldingly resisting the separation of said shells adjacent to the semi-circular edges 69 and 70 thereof.

Operation

In operation the reflective shell 11, Figure 1, is secured to the handle 14, by means of the bracket 15 and the screws 15a and 15b. The guard 22, Figures 1, 2 and 3, is detachably secured to the shell 11 by successively and partially inserting each of said pins into its respective support bracket beginning with the longest pin 29 and progressing through pins 28 and 27, in that order, to the shortest pin 26. When all the pins are thus partially inserted, the guard may then be forced downwardly toward the handle 14 and the pins will enter the hollow brackets to their respective full lengths.

As previously stated, the pin 29, Figures 1, 2 and 3, which is the longest pin and the first to be partially inserted, is bent slightly more than the remaining pins so that it is disposed at an angle to the plane of the other pins. Upon partial insertion of the pin 29 in its support bracket 19, the guard 22 will tilt slightly so that the remaining pins are no longer exactly co-axial with the inside openings in their respective support brackets. Thus to insert the remaining pins, it is necessary to exert a slight bending force upon the guard 22 in order to realign the pins 28, 27 and 26 with their respective support brackets 18, 17 and 16. Upon insertion of the remaining pins 28, 27 and 26, the realigning force is borne by the engagement between said pins and the inside surfaces of their respective support brackets 18, 17 and 16, thereby firmly securing the guard 22 upon the shell 11 so that it will not be disengaged during ordinary usage of the lamp.

To detach the guard 22 from the shell 11, it is only necessary to overcome the binding force exerted between the pins and the inside surfaces of their respective support brackets. This may be accomplished by applying a suitable force to the hook 34, which is secured to the upper end of the guard 22, in a direction away from the handle. Thus, when the lamp is suspended from the bumper of a car, for example, and the car is moved, the resultant force will disengage the guard 22 from the shell 11 before it will break the extension cord.

The link 42, Figures 4 and 5, is primarily designed for adaptation to an extension lamp of the type presently in use. The shank 50 of the hook 40 may be cut at a short distance from the lamp 41, thereby leaving a short rod 45 extending from the lamp. The rod 45 is engaged by the self-tapping threads in the support bar 43 for securement thereto, and the shank 50 is engaged by the self-tapping threads in the swivel connector post 47 for securement thereto.

The swivel pin 48 is inserted into the opening 44 until the parallel end portions 54 and 55 of the fingers 52 and 53 snap into the groove 51. The engagement between the end portions 54 and 55 and the walls of the groove 51 prevent removal of the pin 48 from the opening 44 during normal use of the lamp, while permitting said pin to rotate within said opening. However, the gripping of the groove 51 by the end portions may be overpowered by the application of opositely directed forces upon the hook and the lamp.

When such forces are applied, the end portions 54 and 55 are temporarily, but not permanently, sprung at an angle to the sidewall of the groove 51 engaged thereby, thus permitting a sliding removal of said end portions from said groove with a corresponding outward flexing of the fingers 52 and 53. The resistance to disengagement between said end portions and said groove is, of course, overcome by a force substantially less than the force required to break or disconnect the extension cord.

The connector 63, Figures 6 and 7, is removably attached to the lamp 61 by spreading the shells 64 and 65 apart at their semi-circular edges 69 and 70 against the springs 74 and 75. The circular edges of the shells are then placed over the upper end of the lamp 61 and released so that the grooves 72 and 73 snugly embrace the ring 62, being so held by the springs 74 and 75. The pivotal attachment of the shells upon the shank 68 of the hook 60 enables the hook to swivel with respect to said shell halves.

The grip of the shells upon the support ring 62 affected by the springs 74 and 75 is preferably strong enough to prevent disengagement therebetween during ordinary use of the lamp. However, said grip is likewise overcome by a force substantially less than that required to break or disconnect the extension cord.

Separation of the connector 63 and the lamp 61 is accomplished when sufficient oppositely directed forces are applied to the hook 60 and the lamp 61 thereby effecting a spreading apart of the shells 64 and 65.

It will be observed also that the separation means illustrated in Figures 1, 2, 3, 6 and 7 may also be utilized in effecting a quick change of the bulb.

Although the above mentioned drawings and description apply to particular, preferred, embodiments of my invention, it is not my intention, implied or otherwise, to eliminate other variations or modifications which lie within the scope of the invention unless specifically stated to the contrary in the hereinafter appended claims.

I claim:

1. In an extension lamp having a handle with a reflector secured thereto, the combination comprising: a lamp guard secured to said reflector; said guard having a rod extending therefrom remote from said handle; an elongated bar having a longitudinal opening therethrough, the free end of said rod being secured within one end of said opening, and said bar having a pair of diametrically opposed slots in opposite sidewalls thereof communicating with said opening near the other end thereof; a pin snugly and slidably receivable into the other end of said opening, said pin having a lateral groove therearound; a pair of resilient strips secured to said sidewalls and having flanged ends extending through said slots for separable engagement with the walls of said groove, said ends and groove being the sole means resisting disengagement between said pin and said bar while permitting rotation therebetween; and a lamp suspension device and means securing said pin thereto; whereby the imposition of predeterminable, oppositely directed, forces upon said lamp and said suspension device effects a disengagement between said pin and said bar.

2. In an extension lamp having a handle with a reflector secured thereto, the combination comprising: a lamp guard secured to said reflector, said guard having a rod extending therefrom remote from said handle; an elongated bar having a cylindrical, lengthwise opening therethrough, the free end of said rod being threadedly secured within one end of said opening, and said bar having a pair of directly opposed, laterally extending slots in opposite sides thereof communicating with said opening near the other end thereof; a swivel post having an integral, cylindrical pin at one end thereof slidably receivable into the other end of said opening, said pin having a circumferential groove therearound registerable with said slots, said post having a co-axial opening in the other end thereof; a channel member snugly embracing three sides of said bar including both said slotted sides, the two flanges of said channel extending along said slotted sides substantially beyond the web of said channel to provide a pair of parallel, resilient arms having integral flange portions at the free ends thereof extending toward each other through said slots for releasably engaging the sidewalls of said groove, said flange portions and said groove being the sole means resisting disengagement between said bar and said pin while permitting rotation therebetween; and a suspension device having an end thereof secured within the opening in said pin.

3. In an extension lamp having a handle with a reflector secured thereto, the combination comprising: a lamp guard secured to said reflector, said guard having a rod extending therefrom remote from said handle; an elongated bar having a cylindrical, lengthwise opening therethrough, the free end of said rod being secured within one end of said opening, and said bar having a pair of substantially opposed, laterally extending slots in opposite sides thereof communicating with said opening near the other end thereof; a swivel post having a cylindrical pin at one end thereof slidably receivable into the other end of said opening, said pin having a circumferential groove therearound registerable with said slots; a channel member snugly embracing three sides of said bar including both said slotted sides, the two flanges of said channel extending along said slotted sides substantially beyond the web of said channel to provide a pair of parallel, resilient arms, each arm having a flanged portion at the free end thereof extendable through one of said slots for releasably engaging the sidewalls of said groove, said flange portions and said groove being the sole means resisting disengagement between said bar and said pin while permitting rotation therebetween; a suspension device and means securing said post thereto.

References Cited in the file of this patent

UNITED STATES PATENTS

| | | |
|---|---|---|
| 769,067 | Eldredge | Aug. 30, 1904 |
| 835,666 | Deming | Nov. 13, 1906 |
| 943,792 | Russell | Dec. 21, 1909 |
| 1,076,186 | Bihler | Oct. 21, 1913 |
| 1,234,455 | Fox | July 24, 1917 |
| 1,347,515 | Lutz | July 27, 1920 |
| 1,702,708 | Slocum | Feb. 19, 1929 |
| 1,735,295 | Olley | Nov. 12, 1929 |
| 1,777,003 | Kollath | Sept. 30, 1930 |
| 2,016,827 | Bergstrom | Oct. 8, 1935 |
| 2,391,325 | Maurette | Dec. 18, 1945 |
| 2,489,037 | Kailer | Nov. 22, 1949 |
| 2,538,655 | Preston | Jan. 16, 1951 |

FOREIGN PATENTS

| | | |
|---|---|---|
| 497,163 | Great Britain | Dec. 14, 1938 |
| 509,477 | Great Britain | July 17, 1939 |